United States Patent [19]

Gipson

[11] Patent Number: 4,851,751
[45] Date of Patent: Jul. 25, 1989

[54] PULSE WIDTH MODULATION POWER SUPPLY FOR LOADS SUCH AS ARTIFICIAL HORIZON INDICATOR GYROS AND THE LIKE

[75] Inventor: Ronald G. Gipson, Austin, Tex.

[73] Assignee: Aviation Instrument Manufacturing Corp., Austin, Tex.

[21] Appl. No.: 877,368

[22] Filed: Jun. 23, 1986

[51] Int. Cl.$^4$ ............................................. H02P 5/41
[52] U.S. Cl. .................................... 318/599; 318/811
[58] Field of Search ............... 318/293, 599, 810, 811, 318/778, 779

[56] References Cited

U.S. PATENT DOCUMENTS

| | | | |
|---|---|---|---|
| 3,906,320 | 9/1975 | Doemen | 318/138 X |
| 4,006,391 | 2/1977 | Deering et al. | 318/811 |
| 4,078,192 | 3/1978 | Fultz | 318/810 |
| 4,300,081 | 11/1981 | Van Landingham | 318/599 |
| 4,465,961 | 8/1984 | Landino | 318/811 |
| 4,642,535 | 2/1987 | Hucker | 318/161 |

FOREIGN PATENT DOCUMENTS

| | | | |
|---|---|---|---|
| 57-153590 | 9/1982 | Japan | 318/811 |
| 59-162791 | 9/1984 | Japan | 318/779 |

*Primary Examiner*—Bentsu Ro
*Attorney, Agent, or Firm*—Glaser, Griggs & Schwartz

[57] ABSTRACT

An AC power supply circuit for an AC motor having a main winding and an auxiliary winding includes a capacitor between the auxiliary and main windings to produce a signal having a phase related to the deviation of the motor from a desired rpm. A rectifier receives the phase signal to generate an error signal of magnitude related to the deviation of the motor rpm from the desired operating rpm. A pulse width modulator circuit generates a square wave having a variable duty cycle for connection to the motor, the duty cycle being minimum at the desired operating rpm. The pulse width modulator circuit is responsive to the error signal to increase the duty cycle of the square wave as the motor rpm deviates from the desired operation rpm, so that the motor rpm is maintained over a range of power supply voltages and other operating conditions.

4 Claims, 2 Drawing Sheets

PULSE WIDTH MODULATION POWER SUPPLY FOR LOADS SUCH AS ARTIFICIAL HORIZON INDICATOR GYROS AND THE LIKE

BACKGROUND OF THE INVENTION

1. Field of the Invention

This invention relates to improvements in electronic power supply circuits, and, more particularly, to improvements in power supply inverter circuits for powering loads such as AC motors and the like which require regulated voltages for maintenance of a particular operating state or nominal condition.

2. Description of the Prior Art

In many instances, it is desired to provide an AC voltage which is controlled to maintain a certain operating condition or state of a load. For example, in the operation of AC motors, particularly in environments such as aircraft gyros and the like, maintaining a constant gyro rpm is of particular importance. The maintenance of an aircraft gyroscope motor at a constant operating rpm is difficult, in part, because of the permissible voltage variations which are encountered. The present Federal Aviation Administration standards permit a variation in voltage of plus or minus 15 percent volts DC of the aircraft voltage supply; and gyros, such as may be employed for aviation instruments, should be maintained at a particular rpm for proper service.

Presently, aircraft gyros, for instance, are designed to perform properly at the low voltage range which may be encountered. Consequently, with a conventional power supply, all voltage which is applied higher than the permissible low voltage is wasted during the normal operating mode. At these higher voltages, extra current is applied to the gyro motor which may manifest itself in the form of additional heat which reduces the bearing life by evaporating the bearing lubricants, resulting in a reduction of the lifespan of the motor. Additionally, these voltage changes may affect the rpm of the gyro. The current and voltage relationship is linear, unless a regulator is provided, and, in that event, the regulator regulates the voltage so that further input voltage increases do not result in further increases in output voltage or current. Voltage regulators must be set at a low voltage within the operating range, so that as the input voltage is increased, the voltage applied to the gyro motor stays constant. This results in gyro motors requiring longer periods of time to attain rated operating speed, because the torque is limited due to the lack of amplitude of available voltage. Additionally, the regulator itself imposes an additional load on the power supply which manifests itself in the form of waste heat.

OBJECTS OF THE INVENTION

In light of the above, therefore, it is an object of the invention to provide an AC inverter for powering a load which is to be operated at a particular desired operating state or condition.

It is another object of the invention to provide an AC inverter of the type described which supplies a power signal having a duty cycle which varies in accordance with deviation by the load from a nominal operating state or condition to assist in rapidly restoring the load to the nominal operating state or condition.

It is another object of the invention to provide an AC inverter of the type described which uses a pulse width modulator circuit to generate a signal to a load, and to vary the width of the pulses generated in accordance with variations from the nominal operating state of the load.

These and other objects, features, and advantages will become apparent to those skilled in the art in the following detailed description when read in conjunction with the accompanying drawings and appended claims.

SUMMARY OF THE INVENTION

A power supply for supplying AC power to a load is provided. The power supply includes means for generating an error signal related to a deviation in response of the load relative to a desired operating state. Means are also provided for generating a power signal, or square wave, having a variable duty cycle, the duty cycle being minimum at the desired operating state of the load. Means are also provided responsive to the error signal generating means for increasing the duty cycle of the power signal, or square wave, as the deviation of the load falls below the desired operating state. In accordance with the preferred embodiment of the invention, the load is an AC motor and the desired operating state is the desired operating rpm of the motor.

BRIEF DESCRIPTION OF THE DRAWINGS

The invention is illustrated in the accompanying drawing in which.

In the various figures of the drawing, like reference numerals are used to denote like or similar parts.

DETAILED DESCRIPTION OF THE PREFERRED EMBODIMENTS

Figure 1:
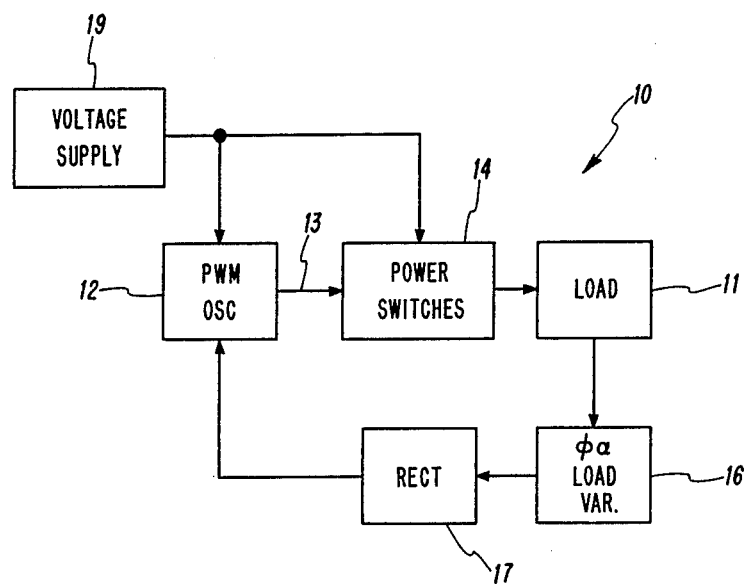
FIG. 1 is a box diagram showing the functional parts of the power supply, in accordance with the invention.

The power supply 10 is shown in block diagram form in FIGURE 1. As shown, power is supplied to a load 11, which in the preferred embodiment is an AC motor having main and auxiliary windings, as will become apparent below, or other load of the type from which a signal having a phase related to variations in a nominal load operating state or condition can be developed. Power is supplied to the load 11 by a pulse width modulator oscillator 12, having a square wave output on line 13 to be amplified by power switches 14 for application to the load 11. As shown, a signal having a phase proportional to the variation by the load from a nominal operating state or condition is detected in a circuit 16.

In the case of an AC motor, the phase signal is developed from the phase difference between the main and auxiliary windings of the motor. The signal is rectified and filtered by circuit 17 and fed back to the pulse width modulator oscillator circuit 12 to modulate the width of the square wave pulses developed on line 13. Power is applied to the pulse width modulator oscillator circuit 12 and power switches 14 by a voltage supply 19.

Figure 2:
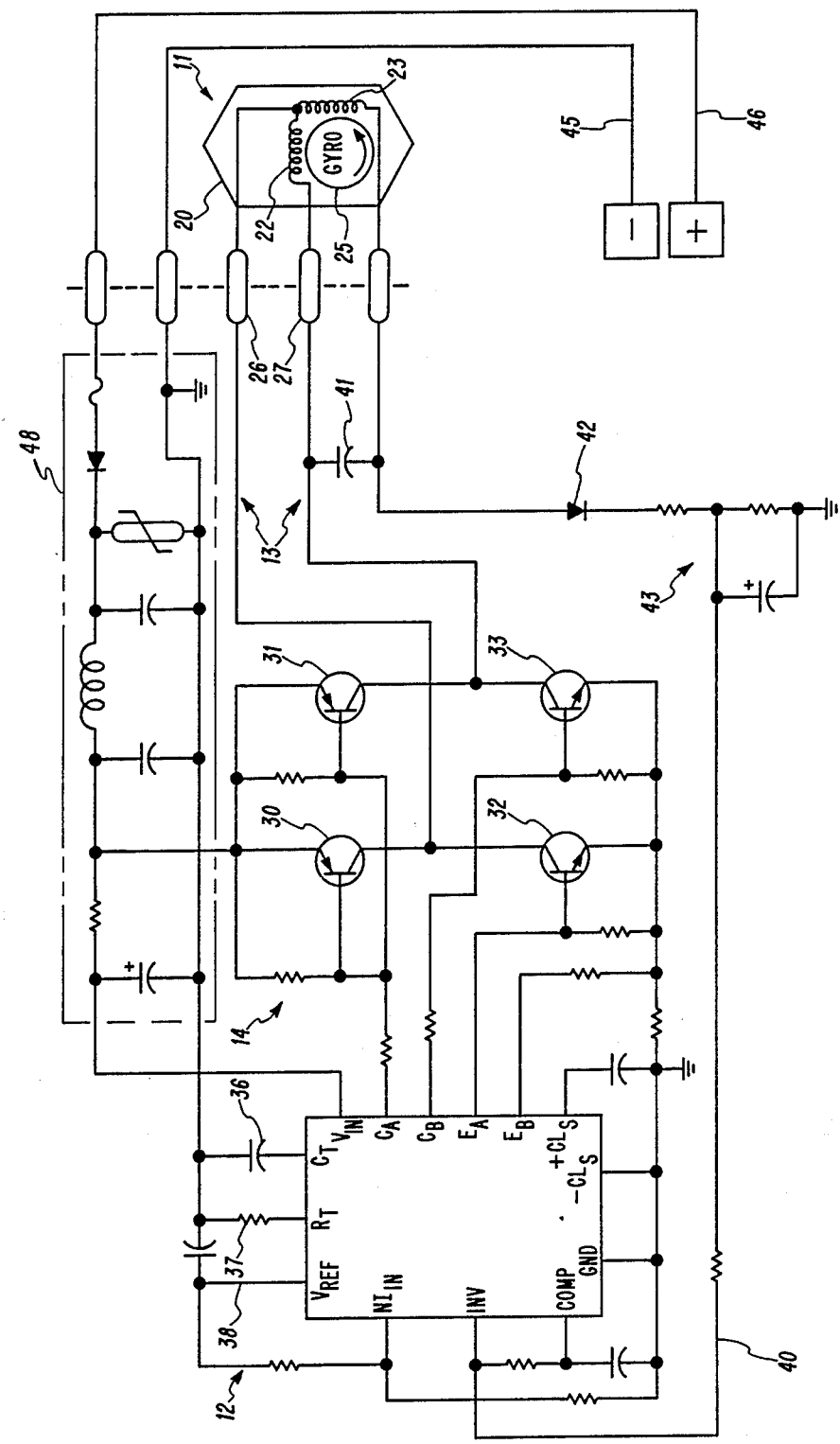
FIG. 2 is a detailed electrical schematic diagram of the power supply, in accordance with the invention; and, FIGS. 3A and 3B are electrical wave forms illustrating the operation of the circuit of FIGS. 1 and 2.

Referring now to FIG. 2, a preferred embodiment of the invention is illustrated. As shown, the load 11 is an AC induction motor 20 which can be, for example, a gyromotor which is used, for instance, in aircraft applications or the like. The AC motor 20 has a main winding 22 and an auxiliary winding 23 which serve to turn the gyro elements 25, all in a manner known in the art.

Power is supplied to the main winding of the motor 20 on terminals 26 and 27. A pulse width modulator oscillator 12 is provided to generate square wave output pulses for application to the motor 20 at terminals 26 and 27. The pulse width modulator oscillator can be, for example, of a type sold by National Semiconductor Company under Part Number LM1524, having the pin connection functions as shown.

The collector and emitter outputs from the regulating pulse width modulator oscillator 12 are connected to power switches 14, as shown, for example transistors 30-33. The outputs on the collector and emitter terminals of the regulating pulse width modulator circuit 12 are connected so that respective transistor pairs 30 and 33 or 31 and 32 are concurrently turned on so that the resulting square wave on lines 13 are pulled both high and low by the transitions of the square wave.

The frequency of the oscillator of the pulse width modulator circuit 12 is controlled by the values of the capacitor 36 and the resistor 37. A reference regulated voltage provided on line 38 is compared to an input signal to control the duty cycle of the oscillator output. The input control signal is provided by the feedback derived from the auxiliary winding 23 of the motor 20 on line 40. The phase of the signal on the auxiliary winding 23 relative to the phase of the main winding 22 is developed across a capacitor 41. The signal is rectified by a diode 42 and filtered by a filter circuit 43, as shown to be fed back to the pulse width modulator circuit 12 on line 40.

Thus, in a typical aircraft gyro motor application, by careful selection of the resistor 37 and the capacitor 36, the output frequency applied to the motor 20 is selected to be about 400 HZ giving the motor a nominal speed of about 24,000 rpm. By sensing the phase of the main winding of the motor 20 compared to the auxiliary winding or capacitance phase, a signal which is related to the speed of the gyroscope is produced. The amplitude of the capacitance phase is directly proportional to input voltage and additionally affected by the rpm of the motor such that maximum amplitude occurs at maximum motor rpm and input voltage. Thus, as the motor starts at a relatively slow rpm, the capacitance phase voltage is initially much lower than it will be once the motor gets up to its normal operating speed. As the motor approaches its nominal speed, the capacitance phase voltage starts to rise significantly.

Power is supplied to the pulse width modulator 12 and power switches 14 on lines 45 and 46, which are connected to a DC power supply (not shown) of the aircraft or other vehicle with which the apparatus is associated. A seppressor circuit 48 is provided to remove any ripple or other spurious noise effects which may be impressed on lines 45 and 46.

Figure 3A:
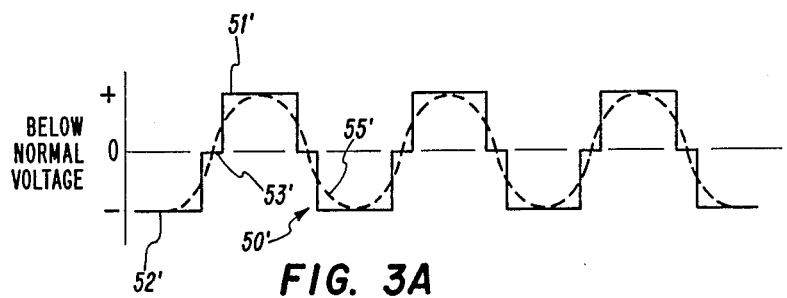
Figure 3B:
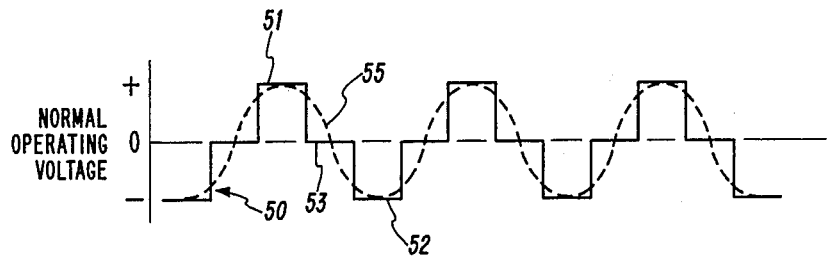

With the circuit thus constituted, the wave forms corresponding with various operating conditions are shown in FIGS. 3A and 3B. Thus, as shown in FIG. 3B, the output signal on line 13 generated by the pulse width modulator oscillator 12 is generally a square wave 50. The time between the positive and negative going excursions 51 and 52, respectively, at normal operating voltage has a relatively low duty cycle, being evidenced by relatively broad or wide shoulders 53. Thus, it can be seen, that the square wave signal approximates a sine wave 55 having a low duty cycle.

In the operation of the circuit 10, the pulse width modulator 12 is adjusted to provide a wave form substantially as shown in FIG. 3B for normal operating voltages and conditions of the motor 20. If the rotational speed of the gyro falls below rated rpm, for example, because the supply voltage from the power supply 19 is reduced for some reason, as shown in FIG. 3A, the duty cycle of the signal is increased. This is evidenced by narrower time widths 53' between the positive and negative going excursions 51' and 52' respectively. The sine wave 55' simulated by the wave form 50' likewise has a higher duty cycle. As variations, such as in the supply voltage or in the speed of the motor due to other influences occur, the amplitude of the capacitance phase voltage decreases, thus reducing the control signal 40 fed back to the pulse width modulator oscillator 12, to thereby increase the duty cycle of the signal supplied to the motor 20. It can be seen that due to this operation, as the voltage is decreased from the power supply 19, for instance, the current, within limits, is increased to the motor 20 to maintain its speed at a constant rpm.

A further advantage of the circuit is that because of the above described adjustment of the wave form at the normal operating voltage, during quiescent or normal operating conditions, a minimum amount of current is applied to the motor 20, thereby resulting in increased bearing life due to reduced heat and other damaging factors. Additionally if the speed of the motor attempts to slow down or become reduced, the circuit varies its duty cycle to maintain a normal or desired operating speed. It has also been found that AC motors of the type used in conjunction with gyro motors to which this invention has significant application, run more efficiently than on square wave power supply signals.

Although the invention has been described and illustrated with a certain degree of particularity, it is understood that the present disclosure has been made by way of example only and that numerous changes in the arrangement and combination of parts may be resorted to by those skilled in the art without departing from the spirit and the scope of the invention as hereinafter claimed.

I claim:

1. A control circuit for applying DC pulse powre to an induction motor of the type having a main winding, an auxiliary winding, and a rotor inductively coupled to said windings for rotation at an rpm proportional to the switching rate of said DC pulse power and at a power level proportional to the duty cycle of the switched DC pulse power applied to said windings, comprising, in combination:

a capacitor connectable in series with said auxiliary winding for producing a phase shift in current conducted through said auxiliary winding relative to current conducted through said main winding;

a feedback circuit connectable to said capacitor for receiving a portion of the phase shifted current conducted through said auxiliary winding and for generating a feedback signal having an amplitude proportional to the rotor rpm;

a pulse width modulator circuit connectable to a DC power source for generating a switched square wave having a variable duty cycle, said modulator circuit having an output adapted for applying said square wave to the main winding of said motor; and, said pulse width modulator circuit having an input coupled to said feedback circuit for varying the duty cycle of said square wave in inverse proportional relation with the amplitude of said feedback signal.

2. A power control circuit as defined in claim 1, wherein said DC power source has an operational voltage range which includes a nominal voltage level corresponding with the operation of said load motor at a desired operating state, an over-voltage level which exceeds said nominal voltage level, and an undervoltage level which is less than or equal to said nominal voltage level, the duty cycle of said pulse width modulator circuit being variable from a minimum duty cycle value corresponding with the over-voltage power source level to a maximum duty cycle value corresponding with the under-voltage power source level within the operational range of said DC power source.

3. A power control circuit as defined in claim 2, wherein said
pulse width modulator circuit is adapted for providing 100 percent duty cycle operation of said square wave at said under-voltage power source level.

4. A circuit for controlling the application of pulse power from a DC power source to an induction motor, said DC power source having an operational voltage range which includes a nominal voltage level corresponding with the operation of said induction motor at a desired operating state, an over-voltage level which exceeds said nominal voltage level, and an under-voltage level which is less than or equal to said nominal voltage level, comprising in combination:

means connectable to said DC power source for generating a square wave having a variable duty cycle, said duty cycle being variable from a minimum value corresponding with the over-voltage power source level to a maximum value corresponding with the under-voltage power source level;

means connectable to said induction motor for generating a feedback signal proportional to an operational parameter of the induction motor, said feedback signal generating means including means for generating a signal having a phased magnitude which varies relatably to a deviation by said induction motor from said desired operating state; and, means responsive to said phased magnitude signal for varying the duty cycle of said square wave in inverse proportional relation with said phased magnitude signal.

* * * * *